Oct. 31, 1950     R. S. LANGDON     2,528,314
POWER TRANSMITTING MECHANISM
Filed Aug. 13, 1945     2 Sheets-Sheet 1
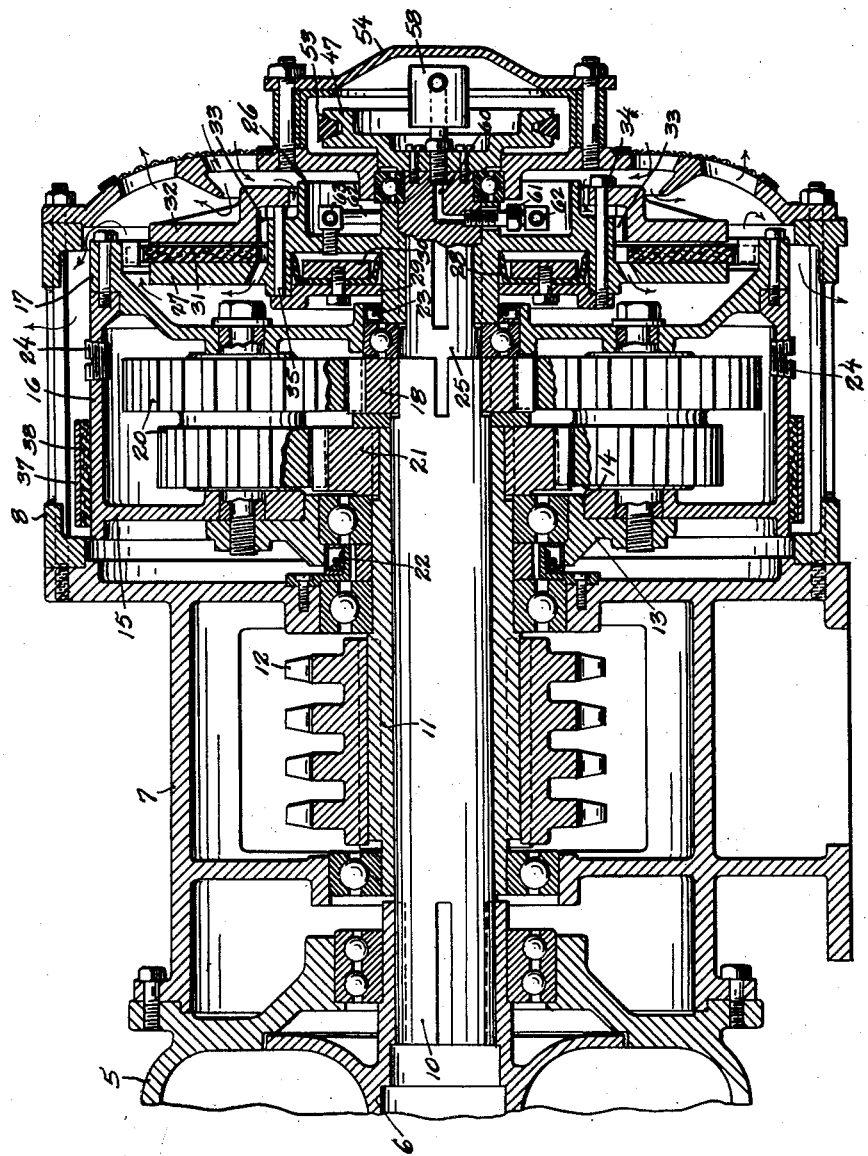
Fig. I.
INVENTOR:
R. S. Langdon
ATTORNEY.

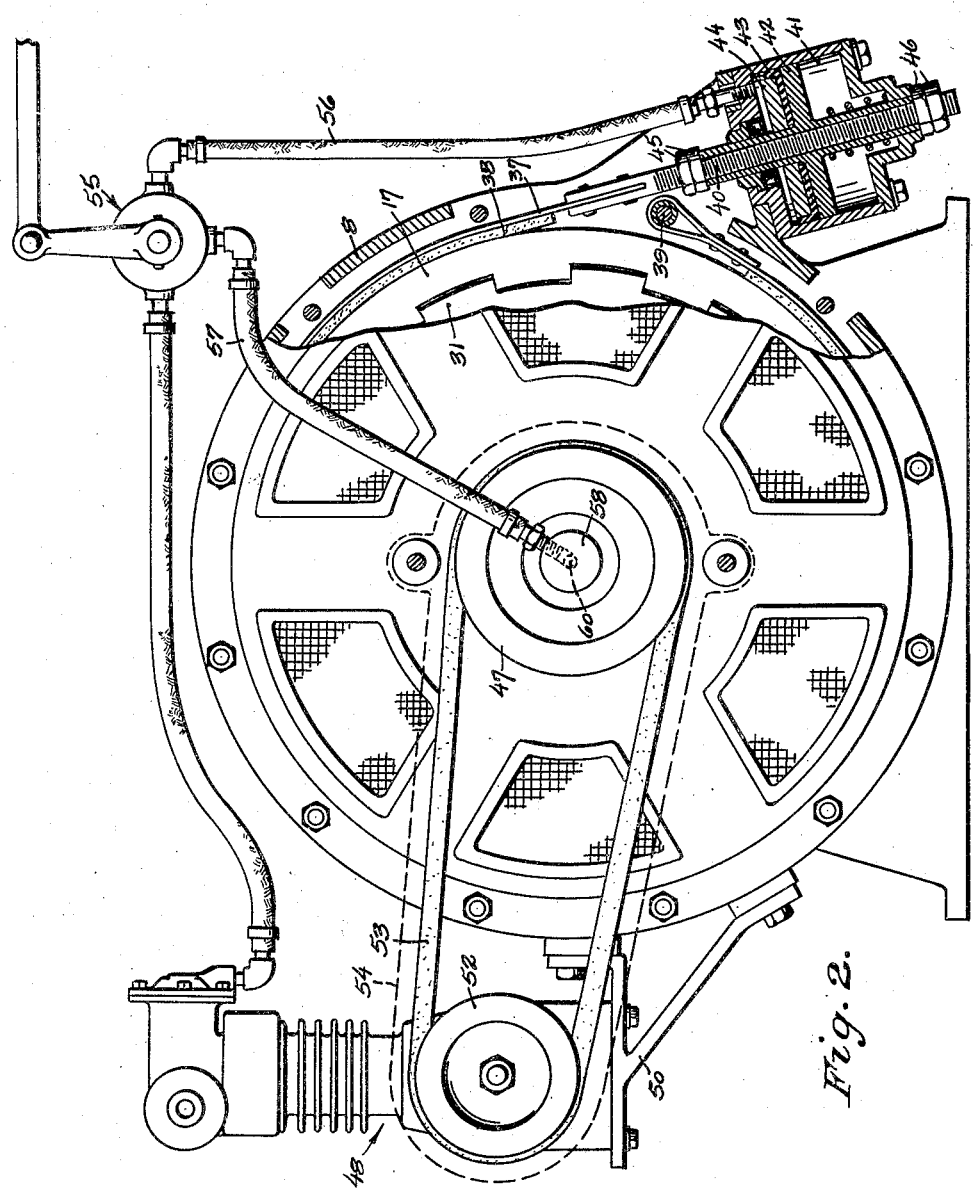

UNITED STATES PATENT OFFICE 2,528,314

POWER-TRANSMITTING MECHANISM

Robert S. Langdon, Seattle, Wash., assignor to Western Gear Works, Seattle, Wash., a corporation of Washington Application August 13, 1945, Serial No. 610,465

6 Claims. (Cl. 74—789)

This invention relates to means associated with a hydraulic torque converter for transmitting the power of the converter and has for its principal object to provide mechanism functional to retain the advantages of cushioned power and uninterrupted acceleration peculiar to a converter while at the same time overcoming the principal disadvantage, namely, rapid loss of output speed, which is characteristic of a torque converter where it is employed under conditions subjecting the converter to rapidly fluctuating loads.

Clarity in an understanding of this general object will perhaps be advanced by here cursorily considering the invention as it is applied to a logging donkey, logging being a field of operation in which frequent and rapid fluctuation of load is especially evident and which, in consequence, lends itself particularly to the employment of the present power-transmitting means.

First considering the nature of a hydraulic torque converter, properties inherent thereto and responsible for the present invention are:

(1) As load increases and slows down the motor, the output torque increases, with maximum output torque multiplication over input torque being about 4¾ to 1. The motor meanwhile has had its speed decreased to approximately two-thirds of the normal governed speed.

(2) The efficiency of the converter decreases very rapidly when output speed drops to a point one-fifth or more under the normal motor speed.

It is this point of reduced efficiency which is to be particularly noted and, referring to a logging operation by way of example, it will be readily appreciated that the act of pulling a log from the woods into a siding subjects the donkey to a rapidly fluctuating load. Aside from the uneven terrain causing a log to frequently dig into the dirt, the log may sideswipe a stump, or it may hit another log. The log frequently frees itself momentarily from one obstruction only to immediately "hang-up" on another obstruction. The result is to repeatedly drop the output speed of the converter into the inefficient range, namely, a range where the R. P. M. is out of all proportion to the torque output, and which is to say, beyond the aforesaid maximum output torque multiplication of 4¾ to 1. There thus develops a halting, intermittent motion of the log with numerous complete "hang-ups" due to the fact that the log, on approaching the obstruction, has insufficient speed to carom off the same. The pull of the converter is relatively "dead," lacking sufficient instantaneous reserve pull to insure a continuous motion. While the converter is quick to slow down, it is extremely sluggish in picking up whenever the output speed is so reduced as to drop into the inefficient range.

Recognizing the foregoing objection to a torque converter where applied to rapidly fluctuating loads, the causitive factor—in my view of the problem—appeared to lie in the absence of stored energy, and it thus became a principal aim of the present invention to meet this deficiency. More especially stated, the invention comprehends the provision of power-transmitting means for use with a torque converter so engineered as to create that which in effect is a flywheel effective to give momentum to the turbine side of the torque converter rather than, as heretofore, upon the latter's fluid-pumping side.

It is a further and important object to devise an improved change-speed transmission for use with a torque converter, and one more particularly which, under a load, allows instant shifting from a direct-drive to a reduction-drive condition permitting an immediate pick-up in the converter output to raise the speed into the range of high efficiency.

Other and still more particular objects and advantages will, with the foregoing, appear and be understood in the following description and claims. The invention consists in the novel construction and in the adaptation and combination of parts hereinafter described and claimed.

In the accompanying drawings:

Figure 1 is a longitudinal vertical sectional view of a combined torque converter and change-speed transmission constructed in accordance with the principles of the instant invention, the converter being shown fragmentarily; and Fig. 2 is an elevational view thereof looking toward the end of the assembly remote from the converter.

Referring to said drawings, the numeral 5 denotes the housing of the torque converter, and 6 the hub of the converter's turbine (not shown). 7 denotes a chain housing, and 8 a transmission housing, the three said housings being coaxially placed and boltably secured, one to another, namely, with the chain housing bolted to the converter housing, and the transmission housing bolted to the chain housing.

Splined into said turbine hub and projecting axially therefrom through the chain housing and into the transmission housing is an input shaft 10, and freely received over this shaft is a hollow output shaft 11 having an output gear or sprocket wheel 12 fixed thereto. For purposes of the present description, the end of the shaft splined into the hub of the turbine will be considered the forward end and the opposite end will be considered the aft end.

Journaled upon said hollow shaft and occupying a position within the transmission housing at that end of the latter which lies nearest the converter, is a disc 13 presenting an annular shoulder 14. A wheel 15, formed with a peripheral flange 16, is arranged to seat upon the shoulder, and there is brought to bear against and bolted to the end face of the flange 16 a bell member 17. Such wheel and bell members are spaced apart and with the disc 13 describe an inner and movable housing 16, 17 lying within the said main and stationary housing 8, and there is received within this movable housing reduction gearing comprised of a drive gear 18 splined to the input shaft 10, a set of surrounding step-gears 20, and a driven gear 21 splined to the output shaft 11, the step-gears being rotative about axes fixed in relation to the movable housing. Gear 18 is of smaller diameter than the gear 21. Oil-seals, as 22 and 23, are provided for the movable housing, and there are also provided plugs 24 for use either in applying oil to or draining oil from the housing.

The input shaft 10 is formed with a step-down portion 25 at the outer end, and this step-down projects beyond the movable housing to substantially the outer end of the stationary housing 8. The flywheel, designated 26, of the present invention is splined to this step-down portion 25, and there is formed centrally of this flywheel to lie in circumscribing relation to the hub an annular cavity functioning as a cylinder.

In the cylinder is received a cup packing 28, a piston proper 29, and a piston follower 30. The cylinder, and as will be hereinafter described, is arranged and adapted to be fed with pressure air exerting force upon said piston 22 in a direction tending to expel the latter from the cylinder.

Intermediate the radial span of the flywheel, there is presented an annular flange which forms the outer wall for the cylinder, and projecting radially beyond this flange is a circular plate 27 constituting a clutching principal. Denoted 31 and facing the plate 27 is a clutch friction plate splined for unitary rotation with the bell member 17, and there is provided, to serve as the complement of the clutch plate 27 for gripping the friction plate therebetween, a clutching plate 32. This clutching plate is splined as at 33 to turn in unison with the member 26—27 and hence becomes a part of the flywheel, both such members being of uncommonly heavy construction. Connection is made by cap-screws 34 from the piston 29 to the clutch plate 32, and in the spaces between the cap-screws there are provided spacer pins 35 and clutch-release springs (not shown). Air passages, seen by an inspection of Fig. 1, give access for circulation of cooling air around the clutch.

In addition to the clutch, there is provided a brake (similarly pressure-air actuated) which is made to operate on the flange 16 of the movable housing and this brake is comprised of a band 37 faced with a friction liner 38 and having one of its ends anchored as at 39 to the stationary housing 8. The other end of the band is made fast to a tangentially placed draw-bar 40, and operative upon this draw-bar for contracting the band is a piston assembly working in a stationary cylinder 41 and comprised of the piston proper 42, a cup packing 43, and a piston follower 44. Adjustment of the brake band is accomplished by means of the nut sets 45—46.

Proceeding now to describe the pressure-air system relied upon for operation of the clutch and brake, it will be seen that the end of the input shaft 10, or which is to say, the step-down portion 25 thereof, projects through and beyond the flywheel 26. Bolted to this exposed end is a sheave 47. Denoted 48 and supported from the stationary housing upon an outrigger stand 50 is a combined air compressor and receiver, and driving this compressor 48 and by the latter located in alignment with the sheave 47, is a sheave 52. 53 designates a V-belt passing about the two sheaves. A hood 54 serving to enclose said belt and the two sheaves is represented by full lines in Fig. 1 and by dotted lines in Fig. 2.

Associated with the compressor 48 is a control valve 55, and connecting with separate outlets of this valve are flexible pipes 56 and 57, the one leading to the brake cylinder 41 and the other to a rotatable seal 58 which is applied to the end of the input shaft 10. This seal gives communication from the pipe 57 to an axially placed end bore 60 of the shaft step-down 25, and from this end bore connection is made by a spinal fixture 61, a curved pipe 62, and an L-fitting 63 with the clutch cylinder of the flywheel 27.

Tracing the operation of the described change-speed structure, and first considering the high-gear running, cylinder 41 is caused to be isolated from the compressor (pressure contents, if any, of the said cylinder being simultaneously "dumped") and pressure is transmitted through the connections 57—58—60—61—62—63 to the cylinder for the clutch-activating piston 29. Forcing this piston 29 outwardly in respect of its said cylinder, the cap-screws 34 are caused to activate the movable plate 32 directively toward the stationary plate 27, and, in consequence of the friction plate 31 being thereby gripped between plates 27 and 32, the movable housing 13—15—17 becomes locked to the flywheel and, hence, to the input shaft 10. A direct drive results as the entire gearing responsively turns as one. Being given the momentum of the flywheel 27—32, the composite structure will carry itself under high gear through momentarily heavy load conditions which would stall the customary converter-powered unit. Otherwise stated, the present invention provides that which has been heretofore absent in power-transmitting mechanisms embodying a torque converter; namely, stored energy as a source of instantaneous reserve power.

Assuming now, that it is desired to change from high to low gear, and which I find to be but infrequently demanded due to the presence of the flywheel at the output end of the converter, the operator shifts the valve 55 to "dump" air from the clutch-activating cylinder and coincidently bring the cylinder 41 into communication with the compressor 48. Responsively releasing the clutch while coincidently contracting the brake band 37 upon the flange 16 of the movable housing 13—15—17 secures the movable housing against rotation and, fixing the axes of the step-gears 20, causes the power from the input shaft 10 to be transmitted from gear 18 to the input pinion of the step-gears. Working as a reduction drive through the output pinions of these localized gears, driven gear 21 drives the sprocket wheel 12 at a lesser speed than the converter's turbine 6 and there develops a corresponding step-up in the torque. Making this described shift in the event of an unduly heavy and continuing load being placed upon the converter, and beyond the compensating capacity of the flywheel 27—32, the converter's output is immediately returned to the desired higher R. P. M. to hold the converter's speed in the efficient range.

It is now an accepted finding, in consequence of extensive usage of yarders embodying the teachings of the present invention, that there is a striking increase in the efficiency as compared with conventional yarders powered from torque converters of like horse-power. Considered in terms of log output, the increase can be conservatively placed at 50%. It is of more than passing interest, moreover, to note that a converter-powered yarder, relying only upon the flywheel feature of the invention—and which is to say driving only under high gear—shows an increase in the log output approaching 35%. The desirable structure is, of course, one cumulating the advantages of the flywheel with the advantages of an instantaneous-change two-speed transmission, the latter being relied upon to keep the turbine of the torque converter in the efficient range of higher speeds, and the flywheel 27—32 to keep the load moving.

The significance of the structural assembly, particularly as the placement of the change-gear parts permits the outer end of the turbine-powered input shaft to be exposed for the mounting thereon of the compressor-driving sheave, should not be overlooked. Also to be noted, in respect of the invention's advantages, is the compactness of the transmission assembly, the provisions for an air-cooling of the clutch, and the arrangement by which the housing which contains the gears produces an oil-tight casing for gear lubricant.

It is thought that the nature of the invention, and the manner of its use, will be clear from the foregoing. Departures from the embodiment which I have elected to illustrate will suggest themselves, and no limitations are to be implied from the foregoing description having express reference thereto, it being my intention that all forms of construction and variations in detail coming within the scope of the hereunto annexed claims are to be considered as comprehended by the invention.

What I claim is:

1. A machine of the class described comprising, in combintion: a torque converter providing an output turbine; a shaft; a driving connection from the output turbine of the converter to said shaft; a second and hollow shaft having a free-fitting journal over said converter-powered shaft; a small-diameter pinion carried by and rotating with the first-named shaft; a large-diameter pinion carried by and rotating with the second-named shaft; a movable housing encasing said pinions and journaled for rotation about the center of said shafts as an axis; step-gears also received within and carried by said housing to mesh with the two pinions; means activated by pressure air for effecting a couple between the first-named shaft and the movable housing to drive the housing in unison with the shaft and, by a responsive locking of the gears, accomplishing a direct-drive connection from the first-named to the second-named shaft; braking means activated by pressure air and arranged when activated to arrest the rotation of the movable housing and hence accomplishing a reduction-drive through said gearing from the first-named to the second-named shaft; a source of compressed air; means for causing air under pressure drawn from said source to be applied either to said coupling means or to said braking means for operating the same alternatively; a power take-off from the second-named shaft to the load and a flywheel for said first-named shaft carried upon the latter for unitary movement therewith and serving to store energy for the output turbine of the converter, said flywheel being made a component part of the recited means for coupling the first-named shaft to the housing.

2. A machine of the class described comprising, in combination: a torque converter providing an output turbine; a driving shaft; a driving connection from the output turbine of the converter to one end of said shaft; a small-diameter pinion carried by and rotating with said driving shaft and occupying a position intermediate the length of the shaft; a second and hollow driven shaft fitting freely over the driving shaft for rotation about a coinciding axis and occupying a position between said pinion and the converter-driven end of the driving shaft; a large-diameter pinion carried for rotation with the driven shaft upon the end of the latter adjacent the small-diameter pinion; a movable housing encasing said pinions and journaled for rotation about the center of the shafts as an axis; step-gears received within and carried by said housing to mesh the two pinions; a clutch acting by its own rotation to circulate air for cooling the clutch and occupying a position beyond the housing at the end of the shaft removed from the converter and acting, when engaged, to couple the housing to the driving shaft and, by a responsive locking of the gears, accomplishing a direct-drive connection from the driving to the driven shaft; braking means for the housing acting, upon the operation thereof coincident with a disengagement of the clutch, to arrest the rotation of the movable housing and hence accomplishing a reduction-drive connection through the gearing from the driving to the driven shaft correlated means for causing said clutch and the braking means to be operated alternatively; and a power take-off from the driven shaft to the load, the clutch comprising a friction plate locked for unitary movement with the housing and received between two clutching plates locked for unitary movement with the driving shaft and being characterized in that the clutching plates are of uncommonly heavy construction to operate as a flywheel for the driving shaft.

3. A machine for transmission of power comprising, in combination: a hydraulic torque converter providing a powered turbine; a drive shaft driven by its forward end from the powered turbine of said converter; a small-diameter pinion carried by and rotating with said drive shaft and occupying a position intermediate the ends of the shaft; a hollow driven shaft fitting freely over the driving shaft for rotation about a coinciding axis and occupying a position between the pinion and said forward end of the driving shaft; a large-diameter pinion carried for rotation with the driven shaft upon the end of the latter proximate to the first-named pinion; a power take-off gear carried for rotation with the driven shaft and located adjacent the aft end of the driven drive shaft; a wheel journaled for rotation about an axis coinciding with that of the shafts; step-gears receiving a journal mounting from the wheel and disposed to mesh the two pinions; a spring-released clutch disposed to occupy a position between the small-diameter pinion and the aft end of the drive shaft and acting, when engaged, to couple the wheel to the driving shaft and, by a responsive locking of the gears, accomplishing a direct drive connection from the driving to the driven shaft; a spring-released brake for the wheel acting, upon the operation thereof coincident with a disengagement of the clutch, to arrest the rotation of the wheel and hence accomplishing a reduction-drive connection through the gears from the driving to the driven shaft; separate units responsive to air pressure and applied one to the clutch and the other to the brake to work in opposition to the springs therefor for operating the clutch and operating the brake; an air compressor, a connection from the extreme aft end of the drive shaft to said compressor for driving the compressor; and connections including control valves leading from the compressor to each of said air pressure units.

4. In power-transmitting mechanism, in combination: a hydraulic torque converter; a drive shaft driven by said converter; a hollow driven shaft fitting freely over the driving shaft for rotation about a coinciding axis; a two-speed transmission contained within the end limits of said driving shaft and including a clutch and a brake operative by actuation of one to effect a direct-drive connection from the drive shaft to the driven shaft and by actuation of the other to effect a speed-reduction drive from the drive shaft to the driven shaft; an air compressor given a stationary mounting; separate control units responsive to air pressure and operative one to actuate the brake and the other to actuate the clutch, one element of said clutch being direct-driven by the drive shaft, and said control unit for the clutch being rotatable with said direct-driven clutch element; connections including control valves leading from the compressor to each of said pressure operated units; and a connection to the compressor from the end of said drive shaft spaced from the converter for driving the compressor.

5. The mechanism of claim 4 having a flywheel on the drive shaft, the flywheel acting to store energy for transmission to the output side of the converter in holding the latter to a high speed where momentarily heavy loads to which the latter is subject would otherwise bring the turbine down to an inefficient speed.

6. In a machine of the class described, and in combination with a casing and a movable housing contained therein; a powered shaft extending axially through and beyond the housing; a hollow driven shaft having a free-fitting journal over the drive shaft and extending by one of its ends into the housing with the other end located exteriorly of the housing; a power take-off from the end of the driven shaft which lies outside the housing; a small-diameter pinion carried by and rotating with the drive shaft to occupy a position within the housing; a large-diameter pinion carried by and rotating with the driven shaft to also occupy a position within the housing; step-gears received within the gear chamber in mesh with the two pinions and made to operate as planetary gears rotating bodily with the housing about the center of the shafts as an axis, said housing being sealed against escape of gear lubricant contained therein; a brake supported by the casing and arranged when operated to arrest the rotation of the housing; an air-cooled clutch located exteriorly of the housing at the end thereof opposite the power take-off for effecting a couple between the drive shaft and the housing and embodying means in its own construction self-sufficient by rotation of the clutch to establish circulation of cooling air in and about the clutch; separate means operable by force of air under pressure for urging the brake and the clutch into positions, respectively, whereat the former performs its described function of arresting the rotation of the housing and the latter performs its described function of coupling the drive shaft to the housing; a source of compressed air; and correlated controls for said last-named separate means acting to deliver air under pressure from said source either to the one or to the other of said separate means for causing the brake and the clutch to be operated alternatively.

ROBERT S. LANGDON.

REFERENCES CITED

The following references are of record in the file of this patent:

UNITED STATES PATENTS

| Number | Name | Date |
| --- | --- | --- |
| 894,878 | Cutler | Aug. 4, 1908 |
| 1,673,863 | Brown | June 19, 1928 |
| 1,855,032 | Sinclair | Apr. 19, 1932 |
| 2,200,597 | Eason | May 14, 1940 |
| 2,307,797 | Kohl | Jan. 12, 1943 |
| 2,308,547 | Schneider | Jan. 19, 1943 |
| 2,326,666 | Miller | Aug. 10, 1943 |
| 2,409,551 | Donnellan | Oct. 15, 1946 |
| 2,413,675 | Baker | Jan. 7, 1948 |
| 2,437,430 | Lawrence | Mar. 9, 1948 |

FOREIGN PATENTS

| Number | Country | Date |
| --- | --- | --- |
| 8,846 | Great Britain | Apr. 13, 1901 |